United States Patent
Yankowich et al.

(10) Patent No.: US 8,161,752 B2
(45) Date of Patent: Apr. 24, 2012

(54) COMBUSTORS WITH INSERTS BETWEEN DUAL WALL LINERS

(75) Inventors: Paul Yankowich, Phoenix, AZ (US); Fang Xu, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 737 days.

(21) Appl. No.: 12/275,050

(22) Filed: Nov. 20, 2008

(65) Prior Publication Data
US 2010/0122537 A1    May 20, 2010

(51) Int. Cl.
*F02C 1/00*    (2006.01)

(52) U.S. Cl. .................................................... 60/752

(58) Field of Classification Search ............ 60/752–760, 60/804, 39.37
See application file for complete search history.

(56) References Cited

U.S. PATENT DOCUMENTS

| | | | |
|---|---|---|---|
| 2,742,762 A * | 4/1956 | Kuhring | 60/752 |
| 3,407,596 A * | 10/1968 | Dasbach et al. | 60/737 |
| 3,899,882 A * | 8/1975 | Parker | 60/752 |
| 4,302,941 A | 12/1981 | DuBell | |
| 4,427,362 A * | 1/1984 | Dykema | 431/4 |
| 4,628,694 A * | 12/1986 | Kelm et al. | 60/752 |
| 4,653,279 A | 3/1987 | Reynolds | |
| 4,695,247 A | 9/1987 | Enzaki et al. | |
| 4,875,339 A | 10/1989 | Rasmussen et al. | |
| 5,277,021 A | 1/1994 | Shekleton | |
| 5,289,686 A | 3/1994 | Razdan et al. | |
| 5,524,430 A * | 6/1996 | Mazeaud et al. | 60/798 |
| 5,687,572 A | 11/1997 | Schrantz et al. | |
| 5,746,048 A | 5/1998 | Shah | |
| 6,170,266 B1 | 1/2001 | Pidcock et al. | |
| 6,408,628 B1 | 6/2002 | Pidcock et al. | |
| 7,000,396 B1 | 2/2006 | Storey | |
| 7,000,397 B2 | 2/2006 | Pidcock et al. | |
| 7,036,316 B2 | 5/2006 | Howell et al. | |
| 7,059,133 B2 | 6/2006 | Gerendas | |
| 7,219,498 B2 * | 5/2007 | Hadder | 60/752 |
| 2003/0145604 A1 * | 8/2003 | Pidcock et al. | 60/796 |
| 2004/0006995 A1 * | 1/2004 | Snyder | 60/796 |

* cited by examiner

*Primary Examiner* — William H Rodriguez
*Assistant Examiner* — Phutthiwat Wongwian
(74) *Attorney, Agent, or Firm* — Ingrassia Fisher & Lorenz, P.C.

(57) ABSTRACT

A combustor includes a first liner; and a second liner forming a combustion chamber with the first liner. The combustion chamber is configured to receive an air-fuel mixture for combustion therein, and the first liner is a first dual wall liner having a first hot wall facing the combustion chamber and a first cold wall. The first cold wall has a first cold wall orifice and the first hot wall has a first hot wall orifice. A first insert is mounted in the first hot wall orifice and is configured to receive a first air jet of pressured air from the first cold wall orifice, and guide the first jet through the first hot wall orifice and into the combustion chamber.

17 Claims, 2 Drawing Sheets

COMBUSTORS WITH INSERTS BETWEEN DUAL WALL LINERS

STATEMENT REGARDING FEDERALLY SPONSORED RESEARCH OR DEVELOPMENT

This invention was made with Government support under Contract No. W911W6-05-2-0004 awarded by United States Army. The Government has certain rights in this invention.

TECHNICAL FIELD

The present invention generally relates to gas turbine engine combustors, and more particularly, to dual wall combustors with inserts between the hot walls and cold walls for directing pressurized air into the combustion chamber.

BACKGROUND

Gas turbine engines, such as those used to power modern commercial aircraft, typically include a compressor for pressurizing a supply of air, a combustor for burning fuel in the presence of the pressurized air, and a turbine for extracting energy from the resultant combustion gases. The combustor typically includes radially spaced apart inner and outer liners. The inner and outer liners generally define an annular combustion chamber between the compressor and the turbine. A number of circumferentially distributed fuel injectors typically project into the forward end of the combustion chamber to supply the fuel to the combustion chamber, and one or more rows of circumferentially distributed air orifices in the liners admit air into the combustion chamber.

Modern combustors generally attempt to operate at very high temperatures, to achieve high operability, and to produce relatively low gaseous pollutant emissions during combustion, particularly oxides of nitrogen (NOx). One type of combustor that may provide one or more of these advantages is a rich burn, quick quench, lean burn (RQL) combustor, which includes the following three serially-arranged combustion zones: a rich burn zone at the forward end of the combustor, a quench or dilution zone downstream of the rich burn zone, and a lean burn zone downstream of the quench zone. By precisely controlling the stoichiometries between the air and fuel in each zone, high-temperature excursions can be reduced and the resulting NOx emissions can be minimized. The high temperature and operability requirements, however, often require particular consideration for cooling the combustion liners. Some cooling schemes may present aerodynamic and mechanical design challenges, particularly in the quench zone of the combustor in which the fuel-rich gases from the rich burn zone are rapidly mixed with excess air and passed to the lean burn zone. The design and development of the quench zone geometry is commonly one of the primary challenges in the successful implementation of low-emissions RQL combustors.

Accordingly, it is desirable to provide RQL combustors with a geometry that promotes low NOx emissions and operability is increased. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a turbine engine is provided. The combustor includes a first liner; and a second liner forming a combustion chamber with the first liner. The combustion chamber is configured to receive an air-fuel mixture for combustion therein, and the first liner is a first dual wall liner having a first hot wall facing the combustion chamber and a first cold wall. The first cold wall has a first cold wall orifice and the first hot wall has a first hot wall orifice. A first insert is mounted in the first hot wall orifice and is configured to receive a first air jet of pressured air from the first cold wall orifice, and guide the first jet through the first hot wall orifice and into the combustion chamber.

In accordance with another exemplary embodiment, a combustor liner includes a first wall including a plurality of impingement cooling holes and a first primary orifice; a second wall proximate to the first wall to form a dual wall structure with the first wall, the second wall including a plurality of effusion cooling holes and a second primary orifice generally aligned with the first primary orifice; and an insert mounted in the second primary orifice configured to receive an air jet from the first primary orifice and to guide the air jet through the second wall.

In accordance with yet another exemplary embodiment, a combustor for a turbine engine includes a dual wall, impingement-effusion cooled first liner. The first liner includes a first hot wall and a first cold wall, the first cold wall having a first cold wall orifice and the first hot wall having a first hot wall orifice. A first insert is mounted in the first hot wall orifice for receiving a first air jet of pressured air from the first cold wall orifice, and guiding the first jet through the first hot wall orifice. A dual wall, impingement-effusion cooled second liner forms a combustion chamber with the first liner that is configured to receive an air-fuel mixture for combustion therein. The second liner includes a second hot wall and a second cold wall. The second cold wall has a second cold wall orifice and the second hot wall having a second hot wall orifice. A second insert is mounted in the second hot wall orifice for receiving a second air jet of pressured air from the second cold wall orifice, and guiding the second jet through the second hot wall orifice.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Exemplary embodiments described herein provide a combustor having dual wall liners with a hot wall, a cold wall, and an insert mounted on the hot wall to guide pressurized air from the cold side wall, through the hot side wall, and into the combustion chamber. The inserts may additionally function to provide a metering function for the air flowing through the hot and cold walls and to enable the hot and cold walls to be strain isolated.

Figure 1:
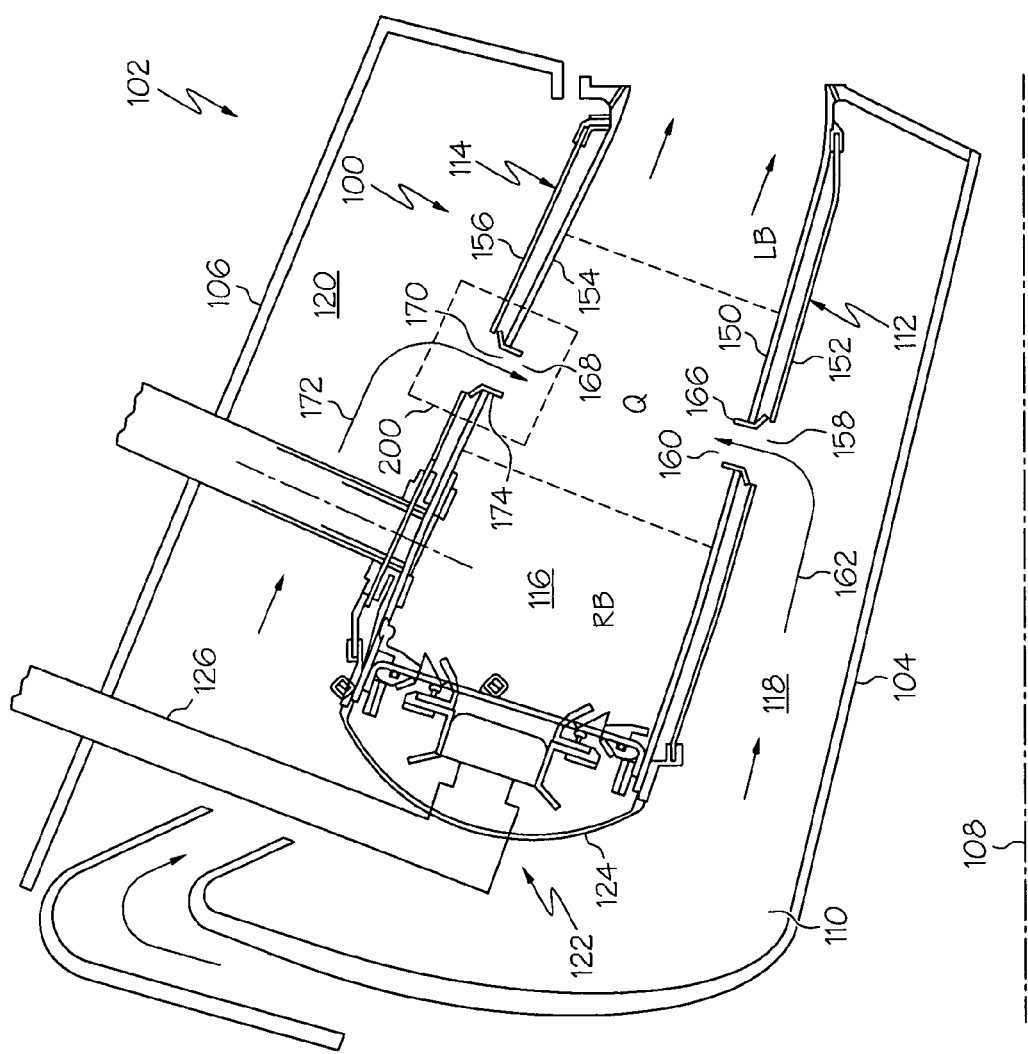
FIG. 1 is a partial, cross-sectional view of a combustor in accordance with an exemplary embodiment.

FIG. 1 is a partial cross-sectional view of a combustor 100 for a gas turbine engine 102 in accordance with an exemplary embodiment. The combustor 100 is an annular combustor, although aspects of exemplary embodiments described herein may also be useful in can combustors, can-annular combustors, and other types of combustors. Exemplary embodiments may find beneficial uses in many industries, including aerospace and particularly in high performance aircraft, as well as automotive and electrical generation.

The combustor 100 suitably includes a radial inner case 104 and a radial outer case 106 concentrically arranged with respect to the inner case 104. The inner and outer cases 104, 106 circumscribe an axially-extending engine centerline 108 to define an annular pressure vessel 110. The combustor 100 further includes an outer liner 114 surrounding an inner liner 112 to define an annular combustion chamber 116. The liners 112, 114 cooperate with cases 104, 106 to define respective outer and inner air plenums 118, 120.

The inner liner 112 shown in FIG. 1 is a dual wall liner with a "hot" wall 150 on the side of the combustion chamber 116 and a "cold" wall 152 on the side of the inner plenum 118. The hot and cold walls 150, 152 of the inner liner 112 each respectively define an orifice 158, 160 though which a jet 162 flows into the combustion chamber 116. An insert 166 is mounted on the orifice 160 of the hot wall 150 and assists in guiding the jet 162 from the orifice 158 in the cold wall 152, through the orifice 160 in the hot wall 150, and into the combustion chamber 116.

Similar to the inner liner 112, the outer liner 114 shown is a dual wall liner with a "hot" wall 154 on the side of the combustion chamber 116 and a "cold" wall 156 on the side of the plenum 120. The hot and cold walls 154, 156 each respectively define an orifice 168, 170 though which a jet 172 flows into the combustion chamber 116. An insert 174 is mounted on the orifice 168 of the hot wall 154 and assists in guiding the jet 172 from the orifice 170 in the cold wall 156, through the orifice 168 in the hot wall 154, and into the combustion chamber 116.

The jets 162, 172 can be considered primary jets that support combustion. Additional jets, arranged in multiple axially displaced locations, can be provided with additional orifices and inserts. The liners 112, 114 and inserts 166, 174 will be discussed in greater detail below after a discussion of other components of the combustor 100 and an overview of the combustion process.

The combustor 100 suitably includes a front end assembly 122 having an annularly extending shroud 124 and fuel injector 126. The shroud 124 extends between and is secured to the forwardmost ends of the inner and outer liners 112, 114. The shroud 124 accommodates the fuel injector 126 and introduces air into the forward end of the combustion chamber 116. The fuel injector 126 introduces a swirling, intimately blended fuel-air mixture that supports combustion in the combustion chamber 116.

The depicted combustor 100 is a rich burn, quick quench, lean burn (RQL) combustor. During operation, a portion of pressurized air enters a rich burn zone RB of the combustion chamber 116 by way of passages in the front end assembly 122. This air intermixes with a stoichiometrically-excessive quantity of fuel introduced through the fuel injector 126 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustion products from the rich burn zone RB, which include unburned fuel, then enter a quench zone Q. As noted above, jets 162, 172 flow from the plenums 118, 120, through the orifices 158, 160; 168, 170 in the inner and outer liners 112, 114, and into the quench zone Q. The jets 162, 172 are referred to as quench air because they rapidly mix the combustion products from their stoichiometrically rich state at the forward edge of the quench zone Q to a stoichiometrically lean state at, or just downstream of, the aft edge of the quench zone Q. As also noted above, additional jets can be provided. The quench air rapidly mixes with the combustion products entering the quench zone Q to support further combustion and release additional energy from the fuel. Since thermal NOx formation is a strong time-at-temperature phenomenon, it is generally desirable that the fuel-rich mixture passing through the quench zone be mixed rapidly and thoroughly to a fuel-lean state in order to avoid excessive NOx generation. Thus the aerodynamic design and sizing of the RB, Q and LB zones, and the design of the quench air jet arrangement in an RQL combustor is important to the successful reduction of emissions levels and achievement of a desired combustor exit temperature distribution important to gas turbine component performance and durability. Finally, the combustion products from the quench zone Q enter a lean burn zone LB where the combustion process concludes.

Figure 2:
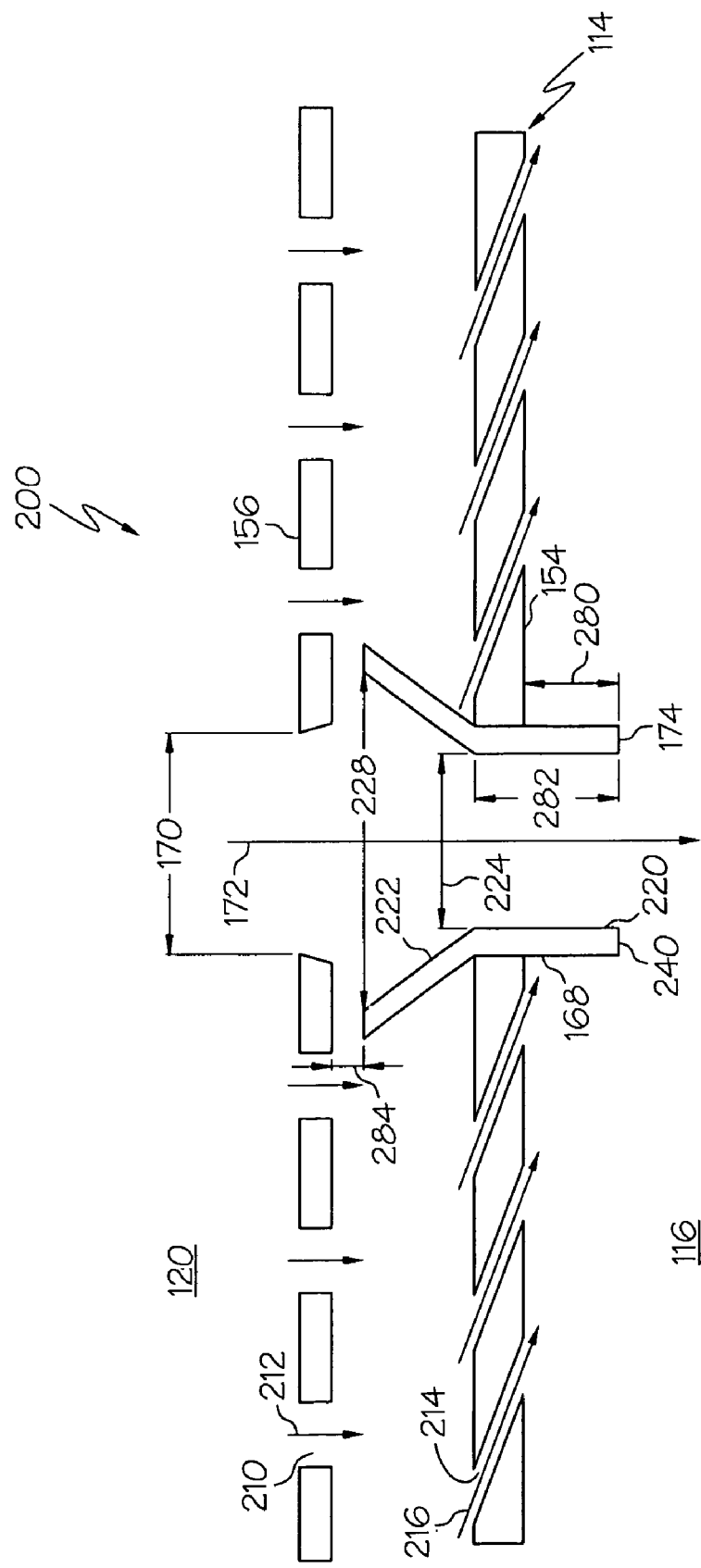
FIG. 2 is an enlarged portion of the combustor of FIG. 1.

FIG. 2 is an enlarged portion 200 of the combustor 100 of FIG. 1. FIG. 2 particularly depicts portions of the hot 154 and cold 156 walls of the outer liner 114. The hot and cold walls 150, 152 of the inner liner 112, including the orifices 158, 160 and insert 166, may have analogous features and arrangements to their outer liner counterparts discussed in reference to FIG. 2. Moreover, additional orifices and inserts with similar features and arrangements can be provided in both the inner and outer liners 112, 114 to provide additional quench jets to the combustion chamber.

As noted above and as best depicted in FIG. 2, the outer liner 114 is a dual wall liner, and particularly is a dual wall liner with impingement-effusion cooling. The cold wall 156 includes a number of impingement cooling holes 210 that admit impingement jets 212 of cooling air to the hot wall 154. The impingement cooling holes 210 are typically 90° to the surface of the cold wall 156, although other arrangements are possible. The hot wall 156 includes a number of effusion cooling holes 214. The effusion cooling holes 214 are relatively small, closely spaced holes serving to direct a flow 216 of cooling air through the hot wall 154. The effusion cooling holes 214 are typically angled at, for example, 15°-45° to the surface of the hot wall 154, and may be oriented to discharge at various angles relative to the bulk combustor gas flow, such that a film of cooling air forms on the hot wall 154.

As also noted above, the insert 174 is mounted on the hot wall 154. The insert 174 may include a cylindrical portion 220 coupled to the outer edges of the orifice 168 in the hot wall 154 and an angled portion 222 extending from the cylindrical portion 220. The angled portion 222 can have an angle relative to the cylindrical portion 220 of, for example, 10° to 50°. Additional or alternate geometric configurations of the cylindrical and angled portions 220, 222 can be provided. The cylindrical portion 220 and the angled portion 222 may be two pieces welded, brazed, or otherwise fastened together, or may be a single piece. The transition between the angled portions 220, 222 can be sharp edged or be made with a blended curved surface. Generally, the cylindrical portion 220 is welded or brazed to the hot wall 154, or may be inserted into orifice 168 without bonding, although other coupling techniques may be provided. The outer edge of portion 222 is made to be flat or contoured to locally match the contour of the cold wall 156 geometry.

The insert 174 is sized within the orifice 168 to minimize leakage between the insert 174 and the hot wall 154. This results in substantially all of the impingement cooling air 212 exhausting through the effusion cooling holes 214 in the hot wall 154.

The insert 174 has a geometric configuration to advantageously direct the jet 172 from the cold wall 156, though the hot wall 154, and into the combustion chamber 116. In some embodiments, the insert 174 and orifice 170 in the cold wall 156 can be configured to meter the jet 172 through the outer liner 114. In other words, the geometry of the insert 174 and orifice 170 can be configured such that flow rate through the orifice 170 is approximately equal to the flow rate through the insert 174, and consequently the orifice 168. In another embodiment, the flow rate through the orifice 170 differs from the flow rate through insert 174 by approximately ±10%. Some considerations that may be manipulated to properly meter the jet 176 include the width of the orifice 170, a first insert width 228 of the insert 174 at the angled portion 222, a second insert width 224 of the insert 174 at the cylindrical portion, the angle of the angled portion 222, and the gap 284 between the insert 174 and cold wall 156. Generally, portions of the jet 172 enter the orifice 170 and attach to the angled portion 222 of the insert 174 before flowing into the combustion chamber 116. The metering function can additionally consider factors such as any differences in pressure drop through the cold wall 156 and the hot wall 154, the density of the jet 172 relative to other jets, the approach angle and velocity of the jets 172, and edge geometry. The gap 284 between the cold wall 156 and insert 174 is generally sized to minimize the gap 284 at hot operating conditions while avoiding interference contact, although various factors can be considered in exemplary embodiments. For example, this gap 284 can be near zero for the inner liner 112 since the hot wall 150 will thermally outgrow the inner cold wall 112, while the outer wall gap is sized, for example, to 0.050 inches to minimize the gap at hot operating conditions.

In some embodiments, the insert 174 enables the hot wall 154 and cold wall 156 to be strain isolated with respect to each other in axial and radial directions. For example, the insert 174 is generally not mechanically connected to the cold wall 156, and a gap 184 is formed between the annular lip of the insert 174 and the cold wall 156. The gap 284 allows relative radially movement between the insert 174 and the cold wall 156, as well as between the hot wall 154 and the cold wall 156. This movement accommodates possible thermal growth differences between the hot wall 154 and the cold wall 156.

Moreover, the width of orifice 170 is typically 10% to 20% larger than the width of the orifice 224 and the width 228 of the insert 174 at the angled portion 222 is typically 25% to 35% larger than orifice 170. This accommodates axial movement of the insert 174 and the cold wall 156 resulting from thermal growth differences, as well as between the hot wall 154 and the cold wall 156, to maintain the general alignment of orifice 170 with orifice 168.

The insert 174 and orifice 170 are also sized and configured to minimize the pressure drop across gap 284, which minimizes leakage through the gap 284 to thus minimize the impact on the aerodynamic design and air flow distribution between the dilution air orifices 170 and the wall cooling air flow.

The cylindrical portion 220 may also have a section 280 that protrudes past the hot side 154 and functions to guide the jet 172 into the gas path of the combustion chamber 116. The cylindrical portion 220 can extend into the combustion chamber 116 or can be flush with the hot wall 154 gas side surface. The section 280 may have an exit geometry configured to optimize the jet characteristic into the combustion chamber 116 and to reduce variability in the exit angle of the jet 172.

The insert 174 may also be made with a step that covers the gap between the orifice 168 in the hot wall 114 and the outside surface of the insert 174 to minimize cooling air leakage into gas path of the combustor chamber 16. In the depicted embodiment, the section 280 has an end 240 with right angles, although other shapes such as oval, square, bevel, and racetrack may be provided based on aerodynamic considerations and durability requirements. The section 280 may have a thermal barrier coating (TBC) to protect the insert within the combustion chamber 116. Additionally, the inserts 174 and combustor liner walls 150 152 154 156 can be made of metallic or ceramic materials, although other material can be used in various embodiments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
    a first liner;
    a second liner forming a combustion chamber with the first liner, the combustion chamber configured to receive an air-fuel mixture for combustion therein,
    the first liner being a first dual wall liner comprising a first hot wall facing the combustion chamber and a first cold wall, the first cold wall having a first cold wall orifice and the first hot wall having a first hot wall orifice; and
    a first insert has a divergent inlet portion between the first cold wall and the first hot wall, the insert mounted in the first hot wall orifice configured to receive a first air jet of pressured air from the first cold wall orifice, and guide the first jet through the first hot wall orifice and into the combustion chamber,
    wherein the first jet has a first flow rate through the first cold wall orifice and a second flow rate through the first insert, and wherein the first flow rate is approximately equal to the second flow rate or differs from the second flow rate by approximately +10%.

2. The combustor of claim 1, wherein the second liner is a second dual wall liner comprising a second hot wall facing the combustion chamber and a second cold wall, the second cold wall having a second cold wall orifice and the second hot wall having a second hot wall orifice, and
    wherein the combustor further comprises a second insert mounted in the second hot wall orifice for receiving a second air jet of pressured air from the second cold wall orifice, and guiding the second jet through the second hot wall orifice and into the combustion chamber.

3. The combustor of claim 1, wherein the first cold wall includes a plurality of impingement cooling holes and the first hot wall includes a plurality of effusion cooling holes.

4. The combustor of claim 3, wherein the plurality of impingement cooling holes includes impingement holes oriented about 90° relative the first cold wall, and the plurality of effusion cooling holes include effusion cooling holes oriented about 15° to 45° relative to the first hot wall.

5. The combustor of claim 1, wherein the combustion chamber defines a rich burn zone, a quench zone, and a lean burn zone, and the first jet introduces pressurized air into the quench zone.

6. The combustor of claim 1, wherein the first cold wall orifice has a first diameter and the insert has a second diameter, greater than the first diameter.

7. The combustor of claim 1, wherein the insert is spaced apart from the first cold wall at a first distance.

8. The combustor of claim 7, wherein the first distance is less than approximately 0.1 inches.

9. The combustor of claim 1, wherein the insert has a cylindrical configuration.

10. The combustor of claim 1, wherein the insert has a body portion coupled to the first hot wall orifice, and the divergent inlet portion extending from the body portion.

11. The combustor of claim 1, wherein at least a portion of the insert projects into the combustion chamber.

12. The combustor of claim 10, wherein the portion of the insert projecting into the combustion chamber includes a thermal barrier coating (TBC).

13. The combustor of claim 1, wherein at least a portion of the insert is flush with the first hot wall.

14. The combustor of claim 1, wherein the first cold wall is strain isolated with respect to the first hot wall.

15. The combustor of claim 1, wherein the first insert is metallic.

16. A combustor liner, comprising:
- a first wall including a plurality of impingement cooling holes and a first primary orifice;
- a second wall proximate to the first wall to form a dual wall structure with the first wall, the second wall including a plurality of effusion cooling holes and a second primary orifice generally aligned with the first primary orifice; and
- an insert has a divergent inlet portion between the first wall and the second wall, the insert mounted in the second primary orifice configured to receive an air jet from the first primary orifice and to guide the air jet through the second wall, wherein the first wall is strain isolated with respect to the second wall.

17. A combustor for a turbine engine, comprising:
- a first liner;
- a second liner forming a combustion chamber with the first liner, the combustion chamber configured to receive an air-fuel mixture for combustion therein,
- the first liner being a first dual wall liner comprising a first hot wall facing the combustion chamber and a first cold wall, the first cold wall having a first cold wall orifice and the first hot wall having a first hot wall orifice; and
- a first insert mounted in the first hot wall orifice configured to receive a first air jet of pressured air from the first cold wall orifice, and guide the first jet through the first hot wall orifice and into the combustion chamber,
- wherein the first cold wall includes a plurality of impingement cooling holes and the first hot wall includes a plurality of effusion cooling holes, and wherein the plurality of impingement cooling holes includes impingement holes oriented about 90° relative the first cold wall, and the plurality of effusion cooling holes include effusion cooling holes oriented about 15° to 45° relative to the first hot wall,
- wherein the combustion chamber defines a rich burn zone, a quench zone, and a lean burn zone, and the first jet introduces pressurized air into the quench zone,
- wherein the first insert is spaced apart from the first cold wall at a first distance,
- wherein the first insert has a body portion coupled to the first hot wall orifice, and a mouth portion extending from and angled relative to body, the mount portion disposed between the first hot wall and the first cold wall,
- wherein at least a portion of the insert projects into the combustion chamber, and
- wherein the first cold wall is strain isolated with respect to the first hot wall.

* * * * *